US009078143B2

(12) United States Patent
Rodriguez et al.

(10) Patent No.: US 9,078,143 B2
(45) Date of Patent: Jul. 7, 2015

(54) APPARATUS AND METHOD FOR EVALUATING VOICE QUALITY IN A MOBILE NETWORK

(75) Inventors: Demostenes Zegarra Rodriguez, Manaus (BR); Jackson Maia Sousa, Manaus (BR); Gabriel Fernando Pivaro, Manaus (BR)

(73) Assignee: Nokia Technologies Oy, Espoo (FI)

( * ) Notice: Subject to any disclaimer, the term of this patent is extended or adjusted under 35 U.S.C. 154(b) by 11 days.

(21) Appl. No.: 13/816,791

(22) PCT Filed: Aug. 13, 2010

(86) PCT No.: PCT/IB2010/053672
§ 371 (c)(1),
(2), (4) Date: Feb. 13, 2013

(87) PCT Pub. No.: WO2012/020284
PCT Pub. Date: Feb. 16, 2012

(65) Prior Publication Data
US 2013/0143602 A1    Jun. 6, 2013

(51) Int. Cl.
*H04W 24/00*    (2009.01)
*H04M 3/22*    (2006.01)
(Continued)

(52) U.S. Cl.
CPC ............ *H04W 24/00* (2013.01); *H04M 3/2236* (2013.01); *H04M 2207/182* (2013.01); *H04W 24/08* (2013.01); *H04W 64/00* (2013.01)

(58) Field of Classification Search
CPC ....... H04W 64/00; H04W 4/02; H04W 48/04; H04W 68/00
USPC ................... 455/456.1–5, 458, 461
See application file for complete search history.

(56) References Cited

U.S. PATENT DOCUMENTS 6,888,927 B1 *   5/2005   Cruickshank et al. ..... 379/88.11
8,244,186 B1 *   8/2012   Khanka et al. ............. 455/67.11
(Continued)

FOREIGN PATENT DOCUMENTS

JP        2001326726 A    11/2001
WO    WO-2006/116027 A1    11/2006

OTHER PUBLICATIONS

"Functional stage 2 description of Location Services (LCS) (Release 9);" 3GPP TS 23.271, V9.4.0; dated Jun. 2010; retrieved on May 30, 2013 from <http://www.3gpp.org/ftp/Specs/html-info/23271.htm>.
(Continued)

*Primary Examiner* — Cong Tran
(74) *Attorney, Agent, or Firm* — Alston & Bird LLP

(57) ABSTRACT

An example apparatus is provided that receives a first message following conclusion of a voice call between a first apparatus and a second apparatus over a network. And in response to the first message, the apparatus obtains a geographic location of at least the first apparatus, and prepares a second message for transmission to the first apparatus. The second message includes a telephone number of a quality server to enable the first apparatus to initiate a voice call to the telephone number to participate in a voice quality test with the quality server, where the voice quality test includes calculation of a score reflecting a quality of the voice call. The apparatus receives the score, and correlates the score with the geographic location of at least the first apparatus and other network parameters obtained during the test to facilitate tuning the network based on the score and the geographic location.

10 Claims, 8 Drawing Sheets

(51) Int. Cl.
*H04W 24/08* (2009.01)
*H04W 64/00* (2009.01)

(56) References Cited

U.S. PATENT DOCUMENTS

| | | | |
|---|---|---|---|
| 2006/0229087 A1* | 10/2006 | Davis et al. | 455/456.1 |
| 2007/0037570 A1* | 2/2007 | Donovan et al. | 455/423 |
| 2008/0146216 A1* | 6/2008 | Newman et al. | 455/424 |
| 2008/0175228 A1* | 7/2008 | Chang et al. | 370/352 |
| 2009/0111459 A1* | 4/2009 | Topaltzas et al. | 455/423 |
| 2010/0083045 A1* | 4/2010 | Qiu et al. | 714/27 |

OTHER PUBLICATIONS

Goudarzi, M.; "*Evaluation of voice quality in 3G mobile networks*;" Master Thesis at the School of Computing, Communications and Electronics, Faculty of Technology, University of Plymouth, Sep. 2008.

International Search Report for Application No. PCT/IN2010/053672; dated Apr. 7, 2011.

"*Location Services (LCS); Service Description; Stage 1 (Release 8)*;" 3GPP TS 22.071, V8.1.0; dated Dec. 2008; retrieved on May 30, 2013 from <http://www.3gpp.org/ftp/Specs/html-info/22071.htm>.

"*Perceptual Evaluation of Speech Quality (PESQ): An Objective Method for End-to-End Speech Quality Assessment for Narrow-Band Telephone Networks and Speech Codecs*;" P.862; ITU-T Telecommunication Standardization Sector of ITU; dated Feb. 2001; retrieved on May 30, 2013 from <http://www.itu.int/rec/T-REC-P.862-200102-I/en>.

"*Series P: Telephone Transmission Quality: Methods for Objective and Subjective Assessment of Quality*;" P.800; ITU-T Telecommunication Standardization Sector of ITU; dated Aug. 1996; retrieved on May 30, 2013 from <https://www.itu.int/rec/T-REC-P.800-199608-I/en>.

Office Action for Chinese Application No. 201080068513.6 dated Feb. 28, 2015.

\* cited by examiner

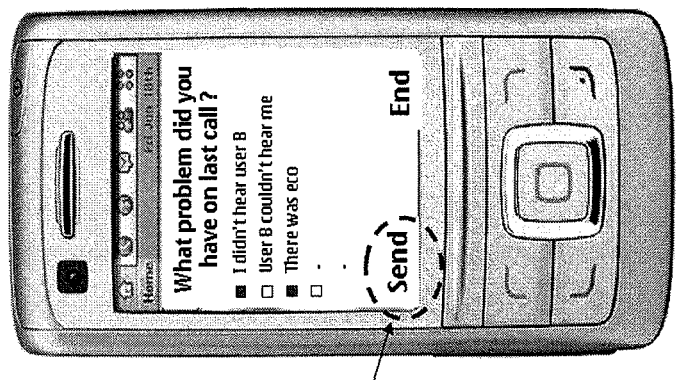
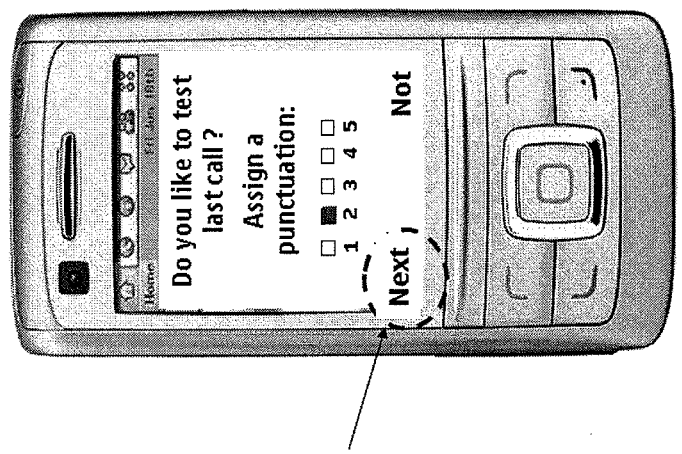
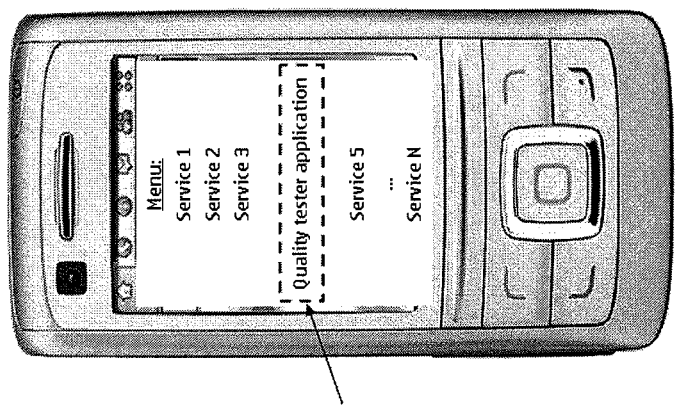
FIG. 4c
FIG. 4b
FIG. 4a

APPARATUS AND METHOD FOR EVALUATING VOICE QUALITY IN A MOBILE NETWORK

TECHNICAL FIELD

Example embodiments of the present invention generally relate to voice quality of service in a mobile network and, more particularly, relate to evaluating voice quality of service in a mobile network through terminal users.

BACKGROUND

There is currently significant research and development of new technologies and services (e.g., social networks) that may be implemented in mobile or wireless networks, where different types of features (e.g., presence, location) may converge to give a more complete service. But in many instances, network operators still fail to ensure a high quality in basic services, such as a voice call, across the all geographic regions where the network operator provides service. This failure in a number of those instances is due at least in part to difficulties in optimizing the network at different points of coverage, in addition to the continuous changes that are made to the network equipment. In this regard, difficulties encountered by network operators include lack of authorization to enter private locations, as well as a significant investment that may be required to engage a sufficient workforce to cover many points of coverage. And further, the rather continual changing of network equipment adds further difficulty in monitoring the network in its area of coverage.

One way of evaluating basic voice services is to evaluate the quality of voice signals received at terminals engaged in a voice call, which should account for any network degradation between the transmitting terminal and the receiving terminal. For this, there are algorithms for objectively assessing the quality of a voice signal and determining a corresponding score or other quantitative value. One algorithm in use today is described in ITU-T Recommendation P.862, entitled: *Perceptual Evaluation of Speech Quality (PESQ): An Objective Method for End-to-End Speech Quality Assessment for Narrow-Band Telephone Networks and Speech Coders*, which has been shown to be an accurate and confident algorithm for determining the quality of a voice signal.

BRIEF SUMMARY

Although algorithms such as PESQ are adequate, it is generally desirable to improve upon existing techniques. Example embodiments of the present invention therefore provide an apparatus and method of evaluating voice quality of service in a mobile network through users of such voice services. Through user participation, example embodiments of the present invention enable the network operator to collect useful information regarding the users' subjective assessment of (or user's perceived) voice signal quality, which may be used by the operator to service, maintain or otherwise optimize or tune their network. Additionally or alternatively, the information may be presented to a regulatory authority that may be charged with monitoring network operators to make sure network operators take corrective actions when necessary, or otherwise make sure the networks meet a particular quality of service.

The user's assessment of voice signals received by the user may be tied to the location of the user when the user receives the respective voice signals, which may enable the operator to correlate users' voice quality assessments to regions in the operator's coverage area. Further, example embodiments of the present invention may include a mechanism to objectively evaluate the quality of voice signals to and/or from a mobile user, which may be implemented along with the user's subjective evaluation, or only in instances in which a user indicates an unsatisfactory call quality (quality below a predetermined threshold).

According to one aspect of example embodiments of the present invention, an apparatus (e.g., central quality server—CQS) is provided that includes at least one processor and at least one memory including computer program code. The at least one memory and the computer program code are configured to, with the at least one processor, cause the apparatus to perform at least a number of operations. In this regard, the apparatus is caused to receive a first message following conclusion of a voice call between a first apparatus (e.g., terminal A) and a second apparatus (e.g., terminal B) over a network. In response to the first message, the apparatus is caused to obtain a geographic location of at least the first apparatus, and prepare a second message for transmission to the first apparatus. The second message includes a telephone number of a quality server (e.g., local quality server—LQS) to enable the first apparatus to initiate a voice call to the telephone number to participate in a voice quality test with the quality server, where the voice quality test includes calculation of a score reflecting a quality of the voice call. The apparatus (e.g., CQS) is then caused to receive the score, and correlate the score with the geographic location of at least the first apparatus to facilitate tuning the network based on the score and the geographic location.

In a more particular example, the second message may include a telephone number of a first quality server (e.g., LQS A) local to the first apparatus, and a telephone number of a second quality server (e.g., LQS B) local to the second apparatus. The first apparatus, then, may be enabled to initiate a voice call to the telephone number of each of the first quality server and second quality server, and participate in a voice quality test of the voice call with each of the first quality server and second quality server.

The voice quality test may include an uplink test in which the quality server calculates an uplink score reflecting a quality of the voice call at the quality server, and a downlink test in which the first apparatus (terminal) calculates a downlink score reflecting a quality of the voice call at the apparatus. The apparatus (e.g., CQS) may accordingly be caused to receive the uplink score and downlink score, such as via the respective quality server, and correlate the uplink score and downlink score with the geographic location of at least the first apparatus.

The apparatus (e.g., CQS) may be caused to obtain a geographic location of both the first apparatus and second apparatus. In these instances, the apparatus may be caused to prepare a second message for transmission to each of the first apparatus and second apparatus. The second message to the first apparatus may include a telephone number of a first quality server to enable the first apparatus to initiate a voice call to the respective telephone number to participate in a voice quality test with the first quality server, which may include calculation of a first score. Similarly, the second message to the second apparatus may include a telephone number of a second quality server to enable the second apparatus to initiate a voice call to the respective telephone number to participate in a voice quality test with the second quality server, which may include calculation of a second score. The apparatus may be caused to receive the first score and second score, and correlate the first score and second score with the geographic locations of the first apparatus and second apparatus.

Also in instances in which the apparatus is caused to obtain the geographic location of both the first apparatus and second apparatus, the second message to the first apparatus may also include the telephone number of the second quality server. This may enable the first apparatus to further initiate a voice call to the respective telephone number to participate in a voice quality test with the second quality server, which may include calculation of a third score. The apparatus may be caused to further receive the third score, and correlate the first score, second score and third score with the geographic locations of the first apparatus and second apparatus.

The memory and computer program code may be further configured to, with the at least one processor, cause the apparatus to further obtain an identifier of one of a plurality of cells of the network within which the first apparatus is located, and identify one of a plurality of quality servers based on the identifier of the respective cell of the network. In such instances, the second message may include the telephone number of the identified quality server and enable the first apparatus to initiate the voice call to participate in a voice quality test with the identified quality server.

According to another aspect of example embodiments of the present invention, an apparatus (e.g., terminal) is provided that includes at least one processor and at least one memory including computer program code. The at least one memory and the computer program code are configured to, with the at least one processor, cause the apparatus to perform at least a number of operations. In this regard, the apparatus of this aspect is caused to prepare a first message for transmission from an apparatus following conclusion of a voice call between the apparatus and another apparatus over a network. In response to the first message, the apparatus is caused to receive a second message including a telephone number of a quality server, and initiate a voice call to the telephone number of the quality server. The apparatus is then caused to participate in a voice quality test of the voice call with the quality server, where the voice quality test includes calculation of a score reflecting a quality of the voice call. This voice quality test may be conducted, for example, in accordance with the perceptual evaluation of speech quality (PESQ) algorithm. Transmission of the first message enables obtainment of a geographic location of at least the first apparatus, and participation in a voice quality test enables correlation of the score with the geographic location to facilitate tuning the network based on the score and geographic location.

The memory and computer program code may be further configured to, with the at least one processor, cause the apparatus to further receive from a user of the apparatus, a subjective assessment of a quality of the first call. The apparatus may then be caused to prepare the first message for transmission in response to receipt of the subjective assessment. More particularly, for example, the apparatus may be caused to prepare the first message for transmission in an instance in which the subjective assessment is below a predetermined threshold.

The second message may include a telephone number of a first quality server local to the apparatus, and a telephone number of a second quality server local to the other apparatus. In such instances, the apparatus may be caused to initiate a voice call to the telephone number of each of the first quality server and second quality server, and participate in a voice quality test of the voice call with each of the first quality server and second first quality server.

Relative to the voice quality test, the apparatus may be caused to participate in an uplink test in which the quality server calculates an uplink score reflecting a quality of the voice call at the quality server, and a downlink test in which the apparatus calculates a downlink score reflecting a quality of the voice call at the apparatus. These tests may enable correlation of the uplink score and downlink score with the geographic location.

BRIEF DESCRIPTION OF THE DRAWING(S)

Having thus described embodiments of the invention in general terms, reference will now be made to the accompanying drawings, which are not necessarily drawn to scale, and wherein:

FIGS. 4a, 4b and 4c are example displays that may be presented by a terminal in receiving a user's subjective assessment of the quality of a voice call, according to various example embodiments of the present invention;

DETAILED DESCRIPTION

Figure 1:
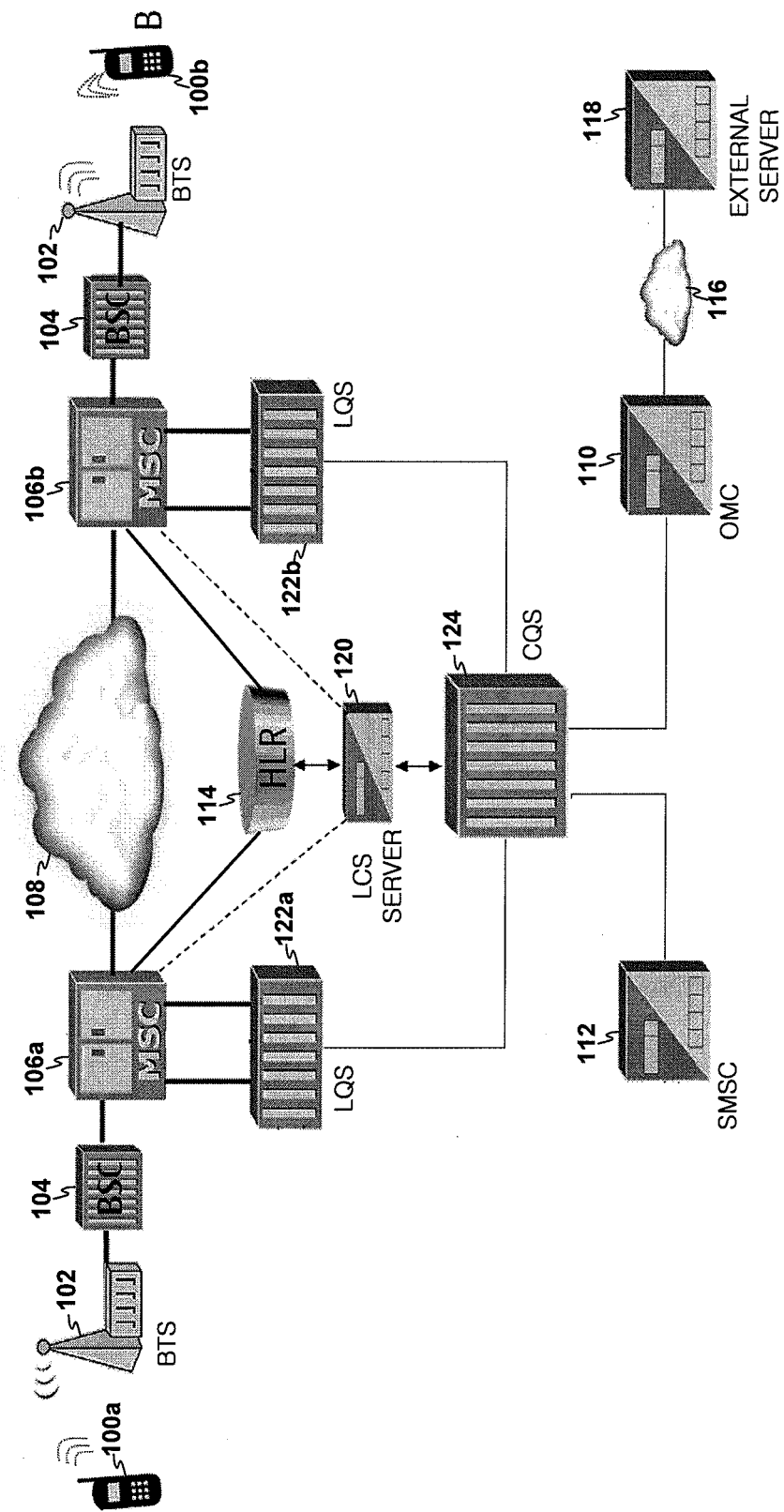
FIG. 1 illustrates a general communication environment according to example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

The terms "data," "content," "information" and similar terms may be used interchangeably, according to some example embodiments of the present invention, to refer to data capable of being transmitted, received, operated on, and/ or stored. The term "network" may refer to a group of interconnected computers or other computing devices. Within a network, these computers or other computing devices may be interconnected directly or indirectly by various means including via one or more switches, routers, gateways, access points or the like.

Also, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Further, as described herein, various messages or other communication may be transmitted or otherwise sent from one component or apparatus to another component or apparatus. It should be understood that transmitting a message or other communication may include not only transmission of the message or other communication, but may also include preparation of the message or other communication by a transmitting apparatus or various means of the transmitting apparatus.

FIG. 1 illustrates a general communication environment in which example embodiments of the present invention may be applied. The communication environment generally includes components configured to form or otherwise communicate within or across one or more mobile and/or short-range wireless networks (generally a mobile network). Examples of suitable networks may include 3GPP radio access networks, Universal Mobile Telephone System (UMTS) radio access UTRAN (Universal Terrestrial Radio Access Network), Global System for Mobile Communications (GSM) radio access networks, Code Division Multiple Access (CDMA) 2000 radio access networks, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, infrared (IrDA), ultra wideband (UWB), Wibree, Zigbee or the like. 3GPP radio access networks may include, for example, 3G (e.g., GERAN) or 3.9G (e.g., UTRAN Long Term Evolution (LTE) or Super 3G) or E-UTRAN (Evolved UTRAN) networks. Generally, a radio access network may refer to any 2G, 3G, 4G or intervening or higher generation mobile communication networks and their different versions, radio frequency (RF) or any of a number of different wireless networks, as well as to any other wireless radio access network that may be arranged to interwork with such networks.

Although FIG. 1 illustrates a number of components configured to form or otherwise communicate within or across mobile and/or short-range wireless network(s), it should be understood that not every element or component of every possible mobile or short-range wireless network is shown and described herein. It should also be understood that not every connection between the components illustrated in FIG. 1 is necessarily shown and described herein, and that various components may directly or indirectly communicate with one another in manners not necessarily shown or described, such as in any of a number of different manners consistent with the networks identified herein.

As shown, the mobile network serves a number of terminals 100 over a geographic area of coverage divided into a number of cells, each of which may have a unique cell ID (CI). Two terminals are shown for example, including terminal 100a (otherwise terminal A) and terminal 100b (otherwise terminal B). Each cell of the network may include one or more base transceiver stations (BTS) 102 and base station controllers (BSC) 104 to and from which the terminals are configured to transmit signals and receive signals. The mobile network also includes mobile switching centers (MSC) 106 and other components coupled to a core or backbone network 108. Although not directly shown in FIG. 1, these other components may include an operation and maintenance center 110 (OMC) of an operator of the mobile network, which may be coupled to the base station controller and/or MSC.

FIG. 1 illustrates two example MSCs, including MSC 106a (otherwise MSC A) serving terminal 100a and MSC 106b (otherwise MSC B), although the terminals may in fact be served by the same MSC). The MSC is configured to route calls and messages to and from a terminal 100 when the terminal is making and receiving calls. The MSC controls the forwarding of messages to and from a terminal when the terminal is registered with the network, and also controls the forwarding of messages for the terminal to and from a message center such as a short message service center (SMSC) 112 (the connection between the MSC and SMSC not being shown). In this regard, the SMSC may be configured to deliver short message service (SMS) messages within the mobile network. Additionally, the SMSC may be configured to deliver SMS messages of type level 2, also known as SMSdd messages, which instead of being delivered to an inbox of a destination (e.g., terminal), may only appear on a display of the destination for a configurable period of time (e.g., five seconds).

Subscriber data of a terminal 100 may be permanently stored in a home location register (HLR) 114 of the mobile network and temporarily stored in a visitor location register (VLR) (not shown) in an area of which the terminal is located at a given moment. The VLR may contain selected administrative information necessary for call control and provision of the subscribed services for each terminal currently located in the geographical area controlled by the VLR. Although each functional entity can be implemented as an independent unit, manufacturers of switching equipment generally implement the VLR together with the MSC 106 so that the geographical area controlled by the MSC may correspond to that controlled by the VLR, thus simplifying the signaling required. The HLR may contain the identity of the mobile network (usually in the form of an MSC number) where the terminal is currently attached. In this regard, the HLR resides in a home network of the mobile network.

The mobile network may also be coupled to a data network 116. For example, although not directly shown in FIG. 1, the base station controller 104, MSC 106 and/or OMC 110 may be connected to a packet control function (PCF) that is connected to a Packet Data Serving Node (PDSN). In turn, the PDSN may be connected to a wide area network, such as the Internet. Components external to the mobile network such as an external server 118 may be coupled to the data network to thereby provide communication between components of the mobile network and components external to the mobile network.

The mobile network may also include or otherwise communicate with a location services server (LCS) server 120 providing location services for different applications or LCS-clients such as one or more quality servers including, for example, one or more local quality servers (LQS) 122 and/or central quality servers (CQS) 124. FIG. 1 includes two LQSs 122a, 122b respectively associated with MSCs 106a, 106b, which respectively serve terminals 100a, 100b; although in the case the terminals are served by the same MSC, the MSC may be associated with a single LQS. Relative to terminal 100a, LQS 122a (otherwise LQS A) may be considered a local quality server, and LQS 122b (otherwise LQS B) may be considered a remote quality server; and relative to terminal 100b, LQS 122b may be considered a local quality server, and LQS 122a may be considered a remote quality server.

In general terms, the LCS server 120 may be defined as a component configured to provide information concerning the geographical location of a terminal 100. In this regard, the LCS server may be coupled to or integrated with a position determining entity (PDE) (not shown) configured to determine the location information provided by the LCS server. The LCS server may include any of a number of known components in the mobile network such as, for example, a gateway mobile location center (GMLC), as defined by the GSM specification. The LCS server may be configured to receive a request for location information, such as from an LCS client (e.g., CQS). If the LCS client is authorized to receive the location information, the LCS server may initiate determining the location of the terminal, such as by the PDE. The PDE may be configured to receive predefined information concerning the location of the terminal 100, which the PDE may process to determine the geographical location of the terminal. The geographical location may be determined according to one or more appropriate techniques, such as triangulation, Global Positioning System (GPS), assisted GPS (A-GPS), time of arrival (TOA), observed time difference of arrival (OTDOA) or the like.

It should be appreciated that the LCS server 120 and/or the PDE may be implemented anywhere in the mobile network. The LCS server and/or the PDE may be distributed between several components of the network, or may be implemented in a single component. For example, the LCS server may include, and thus perform the functions of, the PDE as well as the functions of the LCS server. The LCS server may also be external to the mobile network. According to one example embodiment, the terminal may implement a LCS server. In such instances, the terminal may be provided with the LCS server processing function and be configured to generate and transmit location information thereof to an LCS client.

The LCS server 120 may include a number of location service components and bearers needed to serve an LCS client. The LCS server may provide a platform that enables the support of location-based services in parallel with other mobile communication services such as speech, data, messaging, other tele-services, user applications and supplementary services. The LCS server may respond to a location request from a properly authorized LCS client with location information (determined by the PDE) for a target terminal 100 specified by the LCS client. The LCS server may therefore provide the LCS client, on request or periodically, the current or most recent geographic location (if available) of the target terminal or, if the location determination fails, an error indication and optionally the reason for the failure. A more detailed description of suitable location services and LCS server and LCS client configured to implement such services may be found in 3GPP TS 22.071 and 3GPP TS 23.271.

The location information received by the LCS client (e.g., CQS 124) may be used for any of a number of different purposes. For example, the LCS client may transmit location-related information to the terminal 100 in a particular geographic area, such as on weather, traffic, hotels, restaurants, or the like. Also, for example, the LCS client may record anonymous location information (e.g., without any terminal identifier), such as for traffic engineering and statistical purposes. Further, as explained below, the LCS client may enhance or support any of a number of supplementary services, such as network optimization or tuning.

Figure 2:
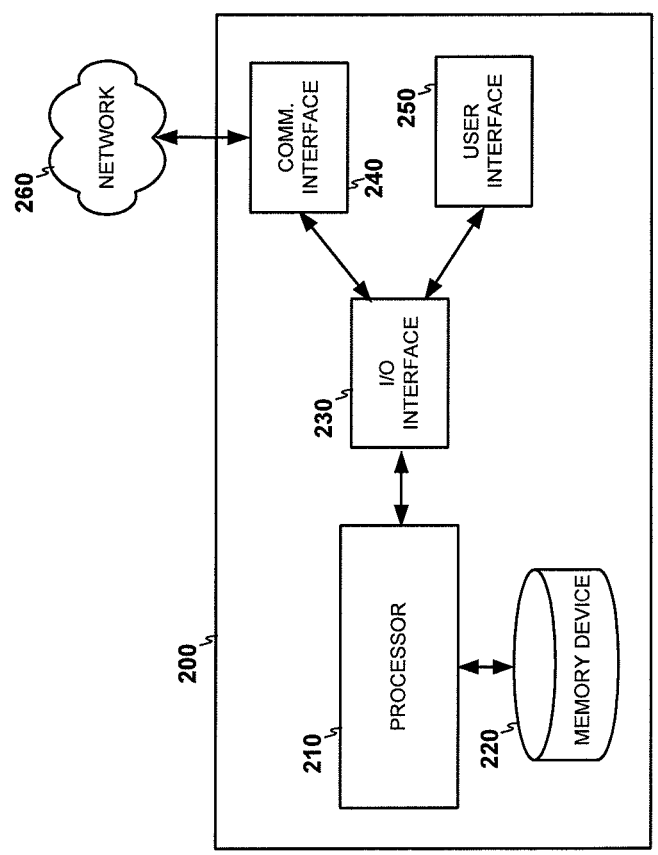
FIG. 2 illustrates an apparatus that may be configured to operate within the communication environment of FIG. 1, according to various example embodiments of the present invention.

Reference is now made to FIG. 2, which illustrates an apparatus 200 according to example embodiments of the present invention configured to perform the various functionalities described herein. As shown and described herein, the example apparatus may be configured to function as, or otherwise implement, one or more of the network components depicted in FIG. 1, e.g., terminal 100, BTS 102, BSC 104, MSC 106, OMC 110, SMSC 112, HLR 114, external server 118, LCS server 120, LQS 122, CQS 124. The example apparatus depicted in FIG. 2 may also be configured to perform example methods of the present invention, such as those shown and described with respect to FIGS. 3, 6 and 7.

In some example embodiments, the apparatus 200 may be embodied as, or included as, a component of a communications device with wired or wireless communications capabilities. In this regard, the apparatus may be configured to operate in accordance with the functionality of one or more network elements as described herein. The example apparatus may include, or otherwise be in communication with, one or more processors 210, one or more memory devices 220, one or more Input/Output (I/O) interfaces 230, one or more communications interfaces 240 and/or one or more user interfaces 250. In FIG. 2 one of each of these components is being shown. The processor may be embodied as various means for implementing the various functionalities of example embodiments of the present invention including, for example, a microprocessor, a coprocessor, a controller, a special-purpose integrated circuit such as, for example, an application specific integrated circuit (ASIC), a field programmable gate array (FPGA), a hardware accelerator, a processing circuitry and/or the like. According to an example embodiment, the processor may be representative of a plurality of processors, or one or more multiple core processors, operating in concert. Further, the processor may be comprised of a plurality of transistors, logic gates, a clock, e.g., oscillator, other circuitry, and/or the like to facilitate performance of the functionality described herein. The processor may, but need not, include one or more accompanying digital signal processors. In some example embodiments, the processor is configured to execute instructions stored in the memory device or instructions otherwise accessible to the processor. The processor may be configured to operate such that the processor causes the apparatus to perform various functionalities described herein.

Whether configured as hardware or via instructions stored on a computer-readable storage medium, or by a combination thereof, the processor 210 may be an entity configured to perform, and/or cause the apparatus 200 to perform, operations according to embodiments of the present invention while configured accordingly. Thus, in example embodiments where the processor is embodied as, or is part of, an ASIC, FPGA, or the like, the processor is specifically configured hardware for conducting, or causing the performance of, the operations described herein. Alternatively, in example embodiments where the processor is embodied as an executor of instructions stored on a computer-readable storage medium, the instructions specifically configure the processor to perform, and/or cause the performance of, the algorithms and operations described herein. In some example embodiments, the processor is a processor of a specific device configured for employing example embodiments of the present invention by further configuration of the processor via executed instructions for performing, and/or causing the performance of, the algorithms, methods, and operations described herein.

The memory device 220 may be one or more tangible and non-transitory computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, read-only memory, flash memory, magnetic storage devices, e.g., hard disks, floppy disk drives, magnetic tape, etc., optical disc drives and/or media, non-volatile random access memory (NVRAM), and/or the like. The memory device may include a cache area for temporary storage of data. In this regard, at least a portion or the entire memory device may be included within the processor 210.

More particularly in the context of a terminal 100, the memory device 220 may further include an integrated circuit card (ICC) configured to store information elements related to a mobile subscriber, such as a mobile telephone number (e.g., MSISDN). As described herein, one suitable ICC is a subscriber identity module (SIM) card. It should be understood, however, that there are other suitable ICCs including, for example, a removable user identity module (R-UIM), universal ICC (UICC) or the like; or even further, the terminal may be configured to operate without an ICC.

Further, the memory device 220 may be configured to store information, data, applications, computer-readable program code instructions, and/or the like for enabling the processor 210 and the example apparatus 200 to carry out various functions in accordance with example embodiments of the present invention described herein. For example, the memory device may be configured to buffer input data for processing by the processor. Additionally, or alternatively, the memory device may be configured to store instructions for execution by the processor.

The I/O interface 230 may be any device, circuitry, or means embodied in hardware, software or a combination of hardware and software that is configured to interface the processor 210 with other circuitry or devices, such as the communications interface 240 and/or the user interface 250. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 200 to perform, various functionalities of the present invention.

The communication interface 240 may be any device or means embodied in hardware, software or a combination of hardware and software that is configured to receive and/or transmit data from/to one or more networks 260, e.g., radio access networks 110, core networks 120, external networks 145, etc., and/or any other device or module in communication with the example apparatus 200. The processor 210 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 240 may be configured to provide for communications in accordance with any of a number of wired or wireless communication standards. In some example embodiments, the communications interface may be configured to communicate in accordance with various techniques including, as explained above, any of a number of 2G, 3G, 4G or intervening or higher generation mobile communication technologies, radio frequency (RF), IrDA or any of a number of different wireless networking techniques. The communications interface may also be configured to support communications at the network layer, possibly via Internet Protocol (IP).

The user interface 250, which is optional and may not be included in all implementations of the apparatus 200, may be in communication with the processor 210 to receive user input via the user interface and/or to present output to a user as, for example, audible, visual, mechanical or other output indications. The user interface may include, for example, a keyboard, a mouse, a joystick, a display, e.g., a touch screen display, a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions, e.g., software and/or firmware, stored on a memory accessible to the processor, e.g., the memory device 220. In some example embodiments, the user interface circuitry is configured to facilitate user control of at least some functions of the apparatus 200 through the use of a display and configured to respond to user inputs. The processor may also comprise, or be in communication with, display circuitry configured to display at least a portion of a user interface, the display and the display circuitry configured to facilitate user control of at least some functions of the apparatus.

As explained in the background section, many network operators have difficulty insuring high quality for voice services due to difficulties optimizing their networks at different points of coverage. Algorithms such as PESQ have been developed to objectively assess the quality of a voice signal. And although these algorithms are adequate, it is generally desirable to improve upon existing techniques. Example embodiments of the present invention therefore provide an apparatus and method of evaluating voice quality of service in a mobile network through users of such voice services. Example embodiments of the present invention may function in the context of a voice call between terminals 100*a* and 100*b* in which the terminals exchange voice signals. Although described as a voice call, it should be understood that example embodiments of the present invention are generally applicable to any communication session between terminals including the exchange of voice signals, including video calls including both a visual and an audio component. Additional aspects of example embodiments may further include similar voice calls between one or both of the terminals and either or both of the LQS 122*a*, 122*b*.

Generally, in accordance with example embodiments of the present invention, at the conclusion of a voice call, a terminal 100 (ICC) may be configured to solicit the user's subjective assessment of the quality of the voice call. This assessment may reflect the quality in any of a number of different manners, such as based on a numeric score, appropriate adjectives and/or questions. In one particular example embodiment, the assessment may reflect quality according to the following numeric scores (increasing proportional to quality): 1=bad; 2=poor; 3=fair; 4=good; and 5=excellent. This scale is described in ITU-T Recommendation P.800, entitled: *Series P: Telephone Transmission Quality Methods for Objective and Subjective Assessment of Quality*. If so desired, this feature of the terminal may be enabled or disabled (temporarily or permanently) by a menu on the terminal, and the feature may be applied to voice-only or video calls.

The terminal may be configured to transmit a message, such as an SMS message, to the CQS 124. This message may include, for example, the telephone numbers (e.g., MSISDN) of the origin and destination terminals, and may also include the user's assessment. The CQS may be configured to identify the terminals and the LQS 122 associated with the MSC 106 servicing each of the terminals. The CQS may be configured to transmit a location request to the LCS server 120 to obtain the geographic location of the terminals. This location information may facilitate the optimization or tuning process of the mobile network by allowing the network operator to pinpoint specific geographical locations where the network may benefit from optimization or tuning.

In addition to transmitting the location request, the CQS 124 may be configured to transmit a message, such as a SMSdd message, to the terminals to ask the respective users if they want to test the quality of their voice services (e.g., "Do you want to test the quality now?"). The messages may include telephone numbers of the terminals' LQS 122 (e.g., include the numbers in the background of the message or otherwise in a non-visible manner). If the user answers the question in the affirmative, the terminal initiates a voice call to their respective LQS to test the terminal's voice quality with the LQS. To ensure that the test call to the LQS does not suffer from link overloading, the MSC 106 associated with the respective LQS may be directly connected to the LQS. In this regard, the load of links (between the MSC and LQS) may be configured to have a maximum 40% of the load, also considering redundancy links.

The origin terminal 100 may be configured to initiate a test of its voice quality with the terminal's LQS 122, and then with the terminal's remote LQS (local LQS of the destination terminal)—or vice versa. The terminal may be configured to present a notification to its user as to the status of these tests (e.g., "testing local place . . . ," "testing remote side . . . "). The destination terminal may be configured to initiate a similar test, but its test in various instances may be limited to only its local LQS (remote LQS of the origin terminal).

The voice quality tests may be performed in any of a number of different manners, but in one example embodiment, the test is performed in accordance with the PESQ algorithm described in ITU-T P.862. For example, the terminal 100 may be configured to store one or more audio test files (e.g., waveform audio file format—WAV—files) copies of which are also stored by the LQS 122. These test audio files may be prepared in accordance with ITU-T P.862. When the user establishes a voice call with one of the LQS, the terminal may be configured to transmit one or more of the respective test audio files to the LQS. The test audio files may suffer some degradation in passing through the mobile network to the LQS such that the test audio files received by the LQS may be degraded test audio files. The LQS may then compare the degraded test audio files with the corresponding copies of the test audio files stored by the LQS in accordance with the PESQ algorithm to calculate a mean opinion score (MOS) for the test audio files (uplink MOS). A similar test may be performed by the LQS on the uplink and by the terminal on the downlink. The MOS calculated by the terminal for the downlink (downlink MOS) may be transmitted or otherwise communicated to the LQS, such as in accordance with dual-tone multi-frequency signaling (DTMF) techniques.

As the voice call is carried out between the terminal 100 and LQS 122, the LQS may collect a number of network parameters that may be forwarded to the CQS 124, and may be useful in evaluating the network at the time of the voice call. These parameters may include, for example, one or more of quality of voice signal, location information, channel information, signal levels, transmission quality, equipments status or the like.

The LQS 122 running tests after a voice call between two terminals may transmit their test results including MOS values (uplink MOS, downlink MOS) and network parameters to the CQS 124. The CQS may then create and transmit one or more messages including a portion of or all of the test results to one or more destinations. These messages may include, for example, a simple network management protocol (SNMP) trap to the OMC 110, a SMS message to one or more users (e.g., terminal users) or the like. Additionally or alternatively, the messages may include a message to a regulatory authority that may be charged with monitoring the network operator.

Figure 3:
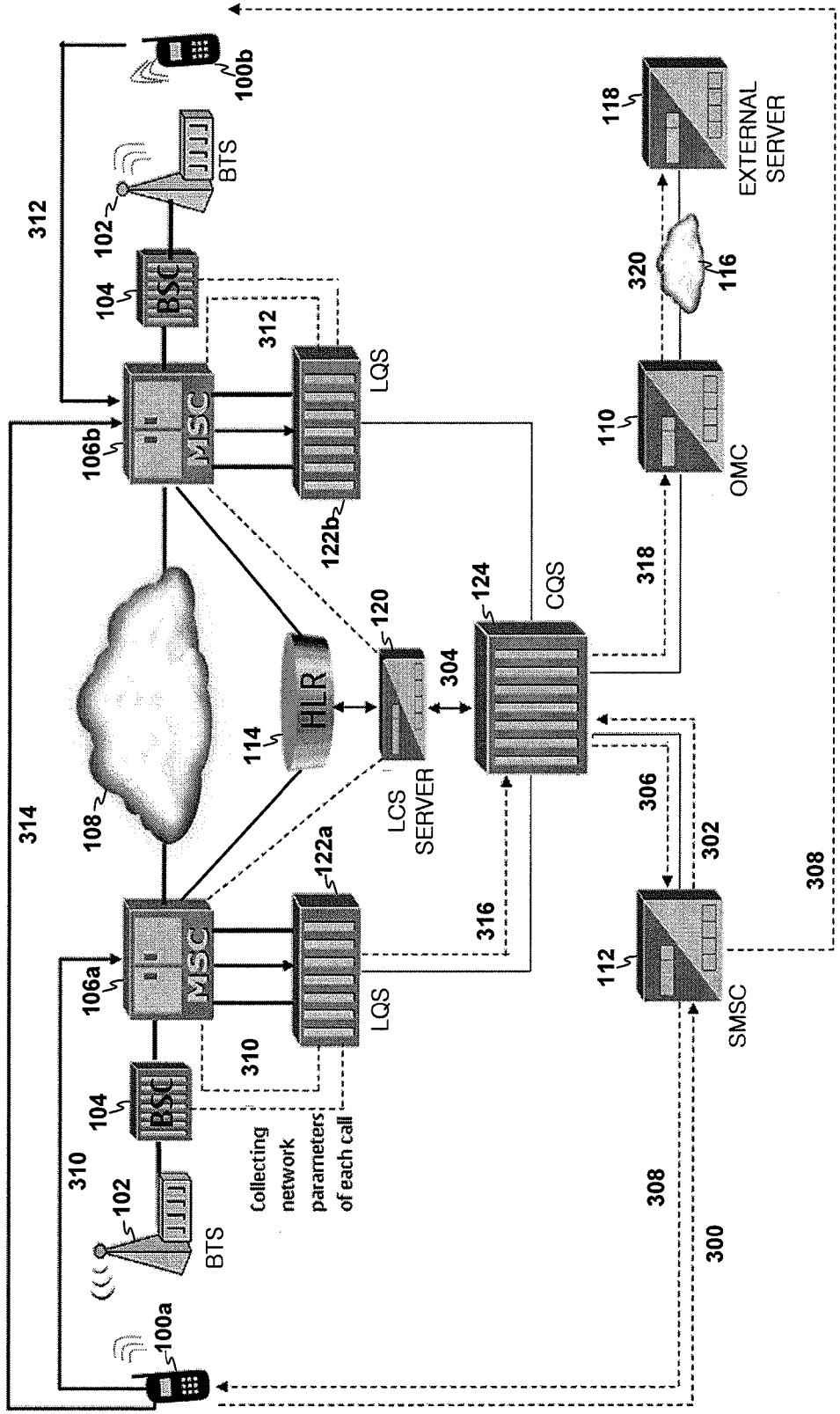
FIG. 3 is a functional block diagram of messages or other communication between components of the communication environment of FIG. 1 carrying out example embodiments of the present invention.

Reference is now made to FIG. 3, which illustrates a functional block diagram of messages or other communication between components of the communication environment of FIG. 1 carrying out example embodiments of the present invention. It should be understood that the communications shown are merely representative of the components between which the communications are transmitted, and do not necessarily reflect the path by which those communications are transmitted.

FIG. 3 illustrates example embodiments of the present invention in which a user A of terminal A 100*a* had a voice call with a user B of terminal B 100*b*. After concluding the voice call, user A navigates the menu on their terminal to locate a service/feature that permits the user to test the quality of their last voice call. FIG. 4*a* illustrates an example menu including the respective service/feature shown as "Quality tester application." The terminal receives user A's selection of the service/feature, and presents one or more displays whereby user A may provide a subjective assessment of their last voice call on a 1-5 scale, and may answer one or more questions describing possible call problems. Examples of suitable displays are shown in FIGS. 4*b* and 4*c*.

After receiving the user A's assessment of their last voice call, terminal A 100*a* transmits a message (e.g., SMS) 300 with information including the telephone numbers of terminal A and terminal B 100*b*, and includes an account (e.g., large account) that identifies the CQS 124 to the SMSC 112. The SMSC transmits the information 302 to the CQS 124, which processes the information and transmits a query 304 to the LCS server 120 and HLR 114 for the cell ID (CI-A, CI-B) and the geographical location of terminals A and B ((Xa, Ya) and (Xb, Yb)). The LCS server provides the requested information, which the CQS thereby obtains from the LCS server.

Figure 5B:
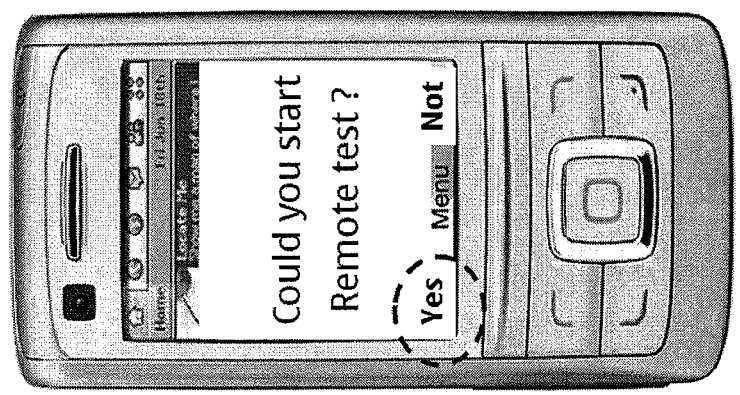
FIGS. 5a and 5b are example displays that may be presented by a terminal in carrying out test calls with local quality servers, according to various example embodiments of the present invention.
Figure 5A:
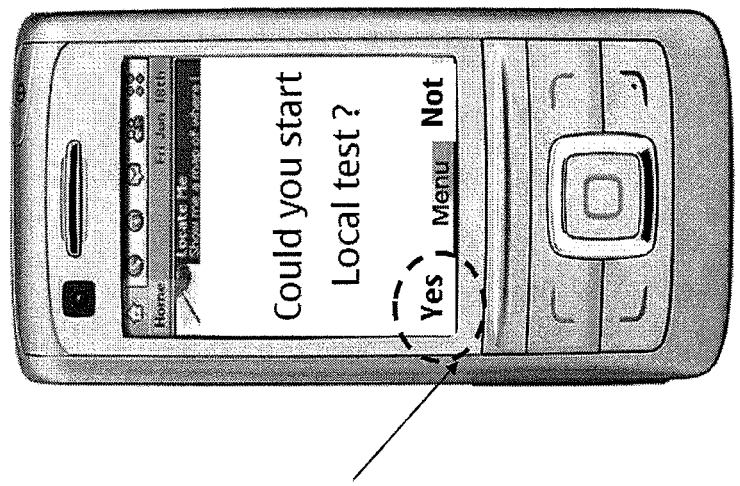

The CQS 124 maintains an information table that relates the CI of cells for a number of MSC 106, which are connected to a number of LQS 122. And each of the LQS has a telephone number that may be called to initiate voice quality testing. By obtaining the CI of the cell including the terminals, the CQS may identify the appropriate LQS (the LQS connected to the MSC of the CI including the terminals) and their respective telephone numbers. The CQS then transmits, to the SMSC, information 306 including the telephone number of LQS A 122*a* connected to MSC A 106*a* providing service to terminal A 100*a*, and the telephone number of LQS B 122*b* connected to MSC B 106*b* providing service to terminal B 100*b*. The SMSC processes this information and transmits messages 308 (e.g., SMSdd) to terminals A and B to ask the respective users if they want to test the quality of their voice services, where the messages include the telephone number of one or both of LQS A and B. FIGS. 5a and 5b illustrate terminal presentations of example messages where the telephone number of the appropriate LQS(s) is in the background of the presented message.

If user A decides to test the quality of their voice service, their terminal A 100a initiates a voice call 310 to the telephone number of LQS A 122a and conducts a voice quality test with LQS A, and then initiates a voice call 314 to the telephone number of LQS B 122b and conducts a voice quality test with LQS B. Before, after or as these voice calls are conducted, terminal B 100b initiates a voice call 312 to the telephone number of LQS 122b and conducts a voice quality test with LQS B. During each of these voice calls, the LQS collects one or more network parameters.

Figure 6:
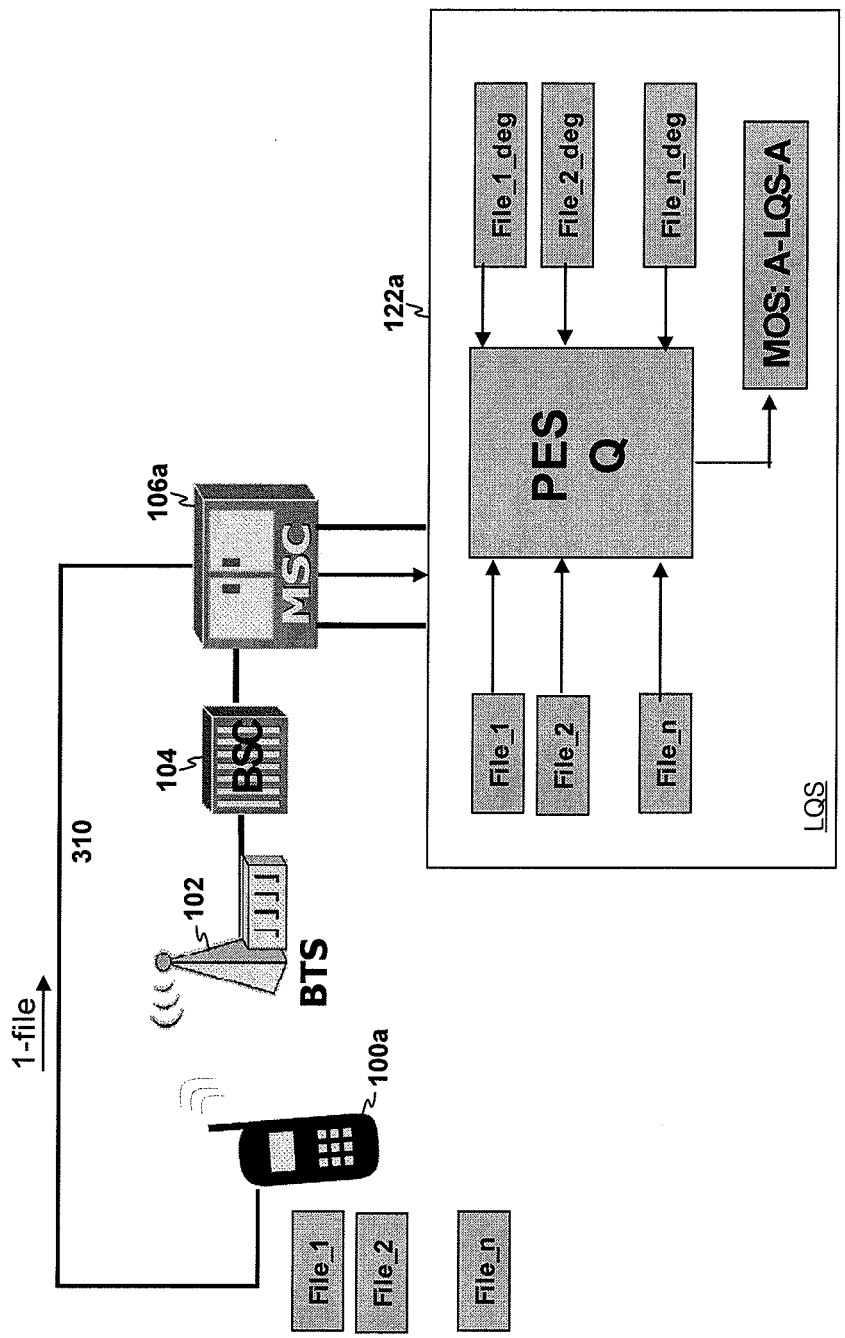
FIGS. 6 and 7 are functional block diagrams of messages or other communication between components carrying out voice quality tests on the uplink and downlink, respectively, according to various example embodiments of the present invention.
Figure 7:
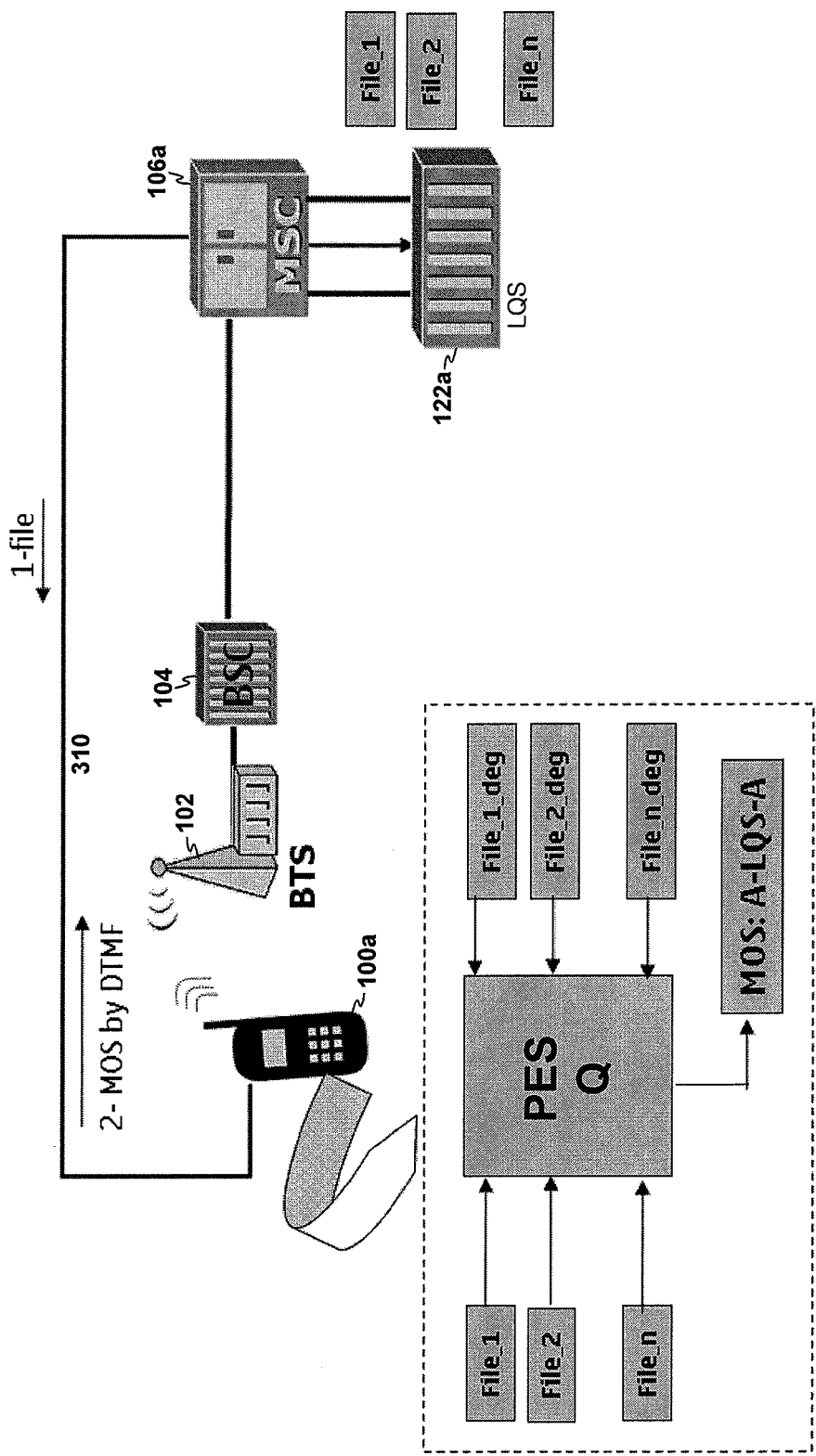

Also, on the uplink during each of the voice calls, and as shown more particularly in FIG. 6 for terminal A 100a and LQS A 122a, the terminal transmits one or more test audio files to the LQS. As indicated above, the test audio files may suffer some degradation such that the test audio files received by the LQS may be degraded test audio files. The LQS may then compare the degraded test audio files with corresponding copies of the test audio files stored by the LQS in accordance with the PESQ algorithm to calculate a MOS for the test audio files. As shown in FIG. 7 for terminal A and LQS A, a similar test may be performed by the terminal on the downlink. The MOS calculated by the terminal for the downlink may be transmitted or otherwise communicated to the LQS, such as in accordance with DTMF techniques. The LQS then, at 316, transmits the test results including the MOS values and network parameters to the CQS 124, which may correlate the test results to the cell ID and/or geographic location of the terminals and maintain the information. The information may be maintained in a number of different manners, such as in tables formatted along the lines presented below.

| Test Identifier | Test Number (e.g., 1001) |
|---|---|
| Phone/Server Numbers | Number A (e.g., 559281507078) |
| | Number B (e.g., 559291729494) |
| | Number LQS-A (e.g., 559221261028) |
| | Number LQS-B (e.g., 559221261038) |
| Quality of Voice Signal (MOS value) | Subjetive evaluation subsc. A (e.g., 2.9) |
| | Test call: LQS A - subsc. A - uplink (e.g., 3.6) |
| | Test call: LQS A subsc. A - downlink (e.g., 3.7) |
| | Test call: LQS B - subsc. A - uplink (e.g., 3.6) |
| | Test call: LQS B - subsc. A downlink (e.g., 3.5) |
| | Test call: LQS B - subsc. B - uplink (e.g., 2.4) |
| | Test call: LQS B - subsc. B - downlink (e.g., 2.4) |
| Location Information | BTS Identifier A - CI-A (e.g., 1111) |
| | BTS Identifier B - CI-B (e.g., 2222) |
| | BSIC A (e.g., 10) |
| | BSIC B (e.g., 20) |
| | Subscriber A (coordinates) (e.g.,) |
| | Subscriber B (coordinates) (e.g.,) |
| Channel Information | AMR codec, Rate (Full Rate, Half Rate, 12 kbps, 22 kbps, etc.). |
| | Modulation Type (GMSK, QPSK, 16 QAM, 64 QAM), Coding ($\frac{1}{2}$, $\frac{2}{3}$, etc) |
| | Frequency Hopping |
| Signal Levels and Transmition Quality | TX Power, |
| | RX Power (RSSI, RSCP) |
| | Path Loss, SIR, EcIo, EcNo, Delay Spread |
| | BER, FER, BLER |
| | CPU usage, Blocked Calls/Cell, Rejected Calls/Cell, Drops/Cell, Erlang/Cell |

In the preceding table, BSIC refers to a BTS identity code, RSSI refers to a received signal strength indicator, ARFCN refers to an absolute radio-frequency channel number, BER refers to bit error ratio, FER refers to frame error ratio, and BLER refers to block error ratio.

The CQS 124 may transmit all or a portion of the collected information 318 to the OMC 110, where the network operator may take action to improve quality in the network. This information may be particularly useful, for example, in cases where the MOS values obtained for multiple users within the coverage of the same cell (e.g. CI=1111) is below a predetermined threshold. The information may be even more particularly useful, for example, where the area realizing low MOS values is smaller than a cell, which may be determined by correlating the MOS values to the geographic locations of the terminals producing those values (as determined by the LCS server 120). Even further, at 320, the information may be transmitted to an external server 118 of a regulatory authority that may be charged with monitoring and evaluating the network operator, such as according to the MOS values.

As explained above, after receiving a user's assessment of the quality of a voice call, a terminal 100 may be configured to transmit a message to the CQS 124. This message, in turn, may lead to the CQS obtaining the location of the terminal and the other terminal to the voice call, and initiating voice quality testing between the terminals and LQS 122. The message from the terminal and subsequent operations including location-determination and voice quality testing may be performed in each instance the user supplies an assessment of a voice call. Alternatively, the message and/or subsequent operations may occur less frequently than after each voice call. For example, the message and/or subsequent operations may occur for a sampling of voice calls. In another example, the message and/or subsequent operations may occur in instances in which the user's assessment of the quality of the voice call is below a predetermined threshold or score (e.g., below 3 in ITU-T P.800).

Figure 8:
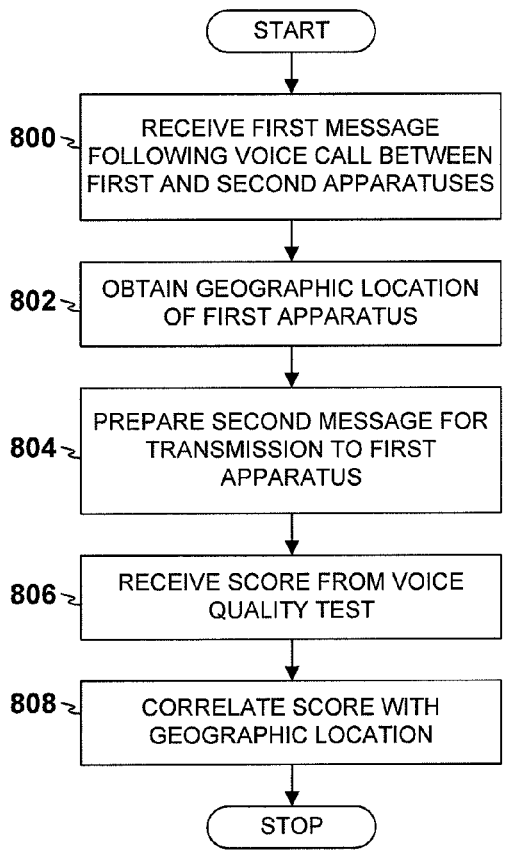
FIGS. 8 and 9 are flowcharts illustrating various steps in methods according to example embodiments of the present invention.
Figure 9:
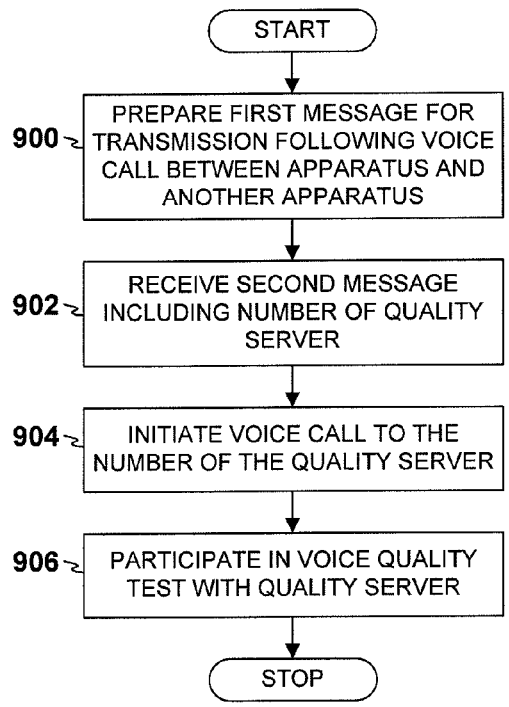

Reference is now made to FIGS. 8 and 9, which illustrate various steps in methods according to example embodiments of the present invention. As shown in FIG. 8, for example, the method of one example embodiment may be performed by a CQS 124 and may include receiving a first message following conclusion of a voice call between a first apparatus (e.g., terminal A 100a) and a second apparatus (e.g., terminal B 100b) over a network, as shown at block 800. In response to the first message, the method may also include obtaining a geographic location of at least the first apparatus, and preparing a second message for transmission to the first apparatus, as shown at blocks 802 and 804. The second message may include a telephone number of a quality server (e.g., LQS A 122a) to enable the first apparatus to initiate a voice call to the telephone number to participate in a voice quality test with the quality server, where the voice quality test includes calculation of a score reflecting a quality of the voice call. The method also includes receiving the score, and correlating the score with the geographic location of at least the first apparatus to facilitate tuning the network based on the score and the geographic location, as shown at blocks 806 and 808.

As shown in FIG. 9, for example, the method of one example embodiment may be performed by a terminal (e.g., terminal A 100a) and may include preparing a first message for transmission from an apparatus following conclusion of a voice call between the apparatus and another apparatus (e.g., terminal B 100b) over a network, as shown at block 900. In response to the first message, the method may also include receiving a second message including a telephone number of a quality server (e.g., LQS A 122a), and initiating a voice call to the telephone number of the quality server, as shown at blocks 902 and 904. The method may include participating in a voice quality test of the voice call with the quality server, where the voice quality test includes calculation of a score reflecting a quality of the voice call, as shown at block 906. This voice quality test may be conducted, for example, in accordance with the perceptual evaluation of speech quality (PESQ) algorithm. Transmission of the first message enables obtainment of a geographic location of at least the first apparatus, and participation in a voice quality test enables correlation of the score with the geographic location to facilitate tuning the network based on the score and geographic location.

As explained above, voice quality tests may be initiated by a terminal user at the conclusion of a voice call between terminal users. It should be understood, however, that similar voice quality tests may be initiated and conducted in a number of other manners. For example, a network operator desiring to monitor the quality of voice services on their network may initiate voice quality tests with various terminal users at different locations within the geographic coverage area of their network. These users may be selected based on some prior agreement with the network operator, and may receive some benefit for their participation (free minutes, free SMS, etc.). The scores (e.g., MOS values) from the respective tests may be correlated with the different locations and provided to the network operator to permit the operator to monitor, and if so desired, tune or optimize their network.

According to example embodiments of the present invention, test scores and their correlated locations may be presented in any of a number of different manners. As described above, for example, the scores, correlated locations and other parameters may be presented in tabular form. Additionally or alternatively, the respective information may be presented graphically. For example, the scores may be presented at their respective locations on a map of the geographic coverage area of the network. The scores may be presented on the map numerically, or in other manners. In one suitable other manner, the scores may be reflected by respective colors on the map. For example, MOS values higher than 4 may be reflected by coloring respective location(s) on the map in green. Similarly, MOS values between 3.5 and 4 may be reflected in yellow, MOS values between 3 and 3.5 may be reflected in orange, and MOS values lower than 3 may be reflected in red.

According to one aspect of the example embodiments of present invention, the functions performed by the apparatus 200, such as those illustrated by the functional block diagrams of FIGS. 3, 6 and 7, and the flowcharts of FIGS. 8 and 9, may be performed by various means, such as processor 210. It will be understood that each block or operation of the functional block diagrams or flowcharts, and/or combinations of blocks or operations in the functional block diagrams or flowcharts, can be implemented by various means. Means for implementing the blocks or operations of the functional block diagrams or flowcharts, combinations of the blocks or operations in the functional block diagrams or flowcharts, or other functionality of example embodiments of the present invention described herein may include hardware, and/or a computer program product including a tangible and non-transitory computer-readable storage medium having one or more computer program code instructions, program instructions, or executable computer-readable program code instructions stored therein. In this regard, program code instructions may be stored on a memory device, such as the memory device 220 of the example apparatus, and executed by a processor, such as the processor 210 of the example apparatus. That is, example embodiments of the present invention may include a computer-readable storage medium having computer-readable program code portions stored therein. The computer-readable storage medium and computer-readable program code portions may be configured to, with at least one processor, cause an apparatus to perform any one or more of the methods or operations of the methods described herein.

As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the functional block diagrams' or flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the functional block diagrams' or flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the functional block diagrams' or flowcharts' block(s) or operation(s).

Accordingly, execution of instructions associated with the blocks or operations of the functional block diagrams or flowcharts by a processor (e.g., processor 210), or storage of instructions associated with the blocks or operations of the flowcharts in a computer-readable storage medium, supports combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code,
the at least one memory and the computer program code configured to, with the at least one processor, cause the apparatus to at least:
receive a first message following conclusion of a voice call between a first apparatus and a second apparatus over a network; and in response thereto,
obtain a geographic location of at least the first apparatus;
prepare a second message for transmission to the first apparatus, the second message including a telephone number of a quality server to enable the first apparatus to initiate a voice call to the telephone number to participate in a voice quality test with the quality server, the voice quality test including calculation of a score reflecting a quality of the voice call;
receive the score; and
correlate the score with the geographic location of at least the first apparatus to facilitate tuning the network based on the score and the geographic location.

2. The apparatus of claim 1, wherein the at least one memory and the computer program code are further configured to, with the at least one processor, cause the apparatus to further:
obtain an identifier of one of a plurality of cells of the network within which the first apparatus is located; and
identify one of a plurality of quality servers based on the identifier of the respective cell of the network,
wherein the second message includes the telephone number of the identified quality server and enables the first apparatus to initiate the voice call to participate in a voice quality test with the identified quality server.

3. The apparatus of claim 1, wherein the second message includes a telephone number of a first quality server local to the first apparatus, and a telephone number of a second quality server local to the second apparatus, to enable the first apparatus to initiate a voice call to the telephone number of each of the first quality server and second quality server, and participate in a voice quality test of the voice call with each of the first quality server and second quality server.

4. The apparatus of claim 1, wherein the voice quality test includes an uplink test in which the quality server calculates an uplink score reflecting a quality of the voice call at the quality server, and a downlink test in which the apparatus calculates a downlink score reflecting a quality of the voice call at the apparatus,
wherein being configured to cause the apparatus to receive the score includes being configured to cause the apparatus to receive the uplink score and downlink score, and
wherein being configured to cause the apparatus to correlate the score includes being configured to cause the apparatus to correlate the uplink score and downlink score with the geographic location of at least the first apparatus.

5. The apparatus of claim 1, wherein being configured to cause the apparatus to obtain a geographic location includes being configured to cause the apparatus to obtain a geographic location of each of the first apparatus and second apparatus,
wherein being configured to cause the apparatus to prepare a second message for transmission includes being configured to cause the apparatus to prepare a second message for transmission to each of the first apparatus and second apparatus,
wherein the second message to the first apparatus includes a telephone number of a first quality server to enable the first apparatus to initiate a voice call to the respective telephone number to participate in a voice quality test with the first quality server, the respective voice quality test including calculation of a first score,
wherein the second message to the second apparatus includes a telephone number of a second quality server to enable the second apparatus to initiate a voice call to the respective telephone number to participate in a voice quality test with the second quality server, the respective voice quality test including calculation of a second score,
wherein being configured to cause the apparatus to receive the score includes being configured to cause the apparatus to receive the first score and second score, and
wherein being configured to cause the apparatus to correlate the score includes being configured to cause the apparatus to correlate the first score and second score with the geographic locations of the first apparatus and second apparatus.

6. The apparatus of claim 5, wherein the second message to the first apparatus further includes the telephone number of the second quality server to enable the first apparatus to further initiate a voice call to the respective telephone number to participate in a voice quality test with the second quality server, the respective voice quality test including calculation of a third score,
wherein being configured to cause the apparatus to receive the score includes being configured to cause the apparatus to receive the first score, second score and third score, and
wherein being configured to cause the apparatus to correlate the score includes being configured to cause the apparatus to correlate the first score, second score and third score with the geographic locations of the first apparatus and second apparatus.

7. A method comprising:
receiving a first message following conclusion of a voice call between a first apparatus and a second apparatus over a network; and in response thereto,
obtaining a geographic location of at least the first apparatus;
preparing a second message for transmission to the first apparatus, the second message including a telephone number of a quality server to enable the first apparatus to initiate a voice call to the telephone number to participate in a voice quality test with the quality server, the voice quality test including calculation of a score reflecting a quality of the voice call;
receiving the score; and
correlating the score with the geographic location of at least the first apparatus to facilitate tuning the network based on the score and the geographic location.

8. The method of claim 7 further comprising:
obtaining an identifier of one of a plurality of cells of the network within which the first apparatus is located; and
identifying one of a plurality of quality servers based on the identifier of the respective cell of the network,
wherein the second message includes the telephone number of the identified quality server and enables the first apparatus to initiate the voice call to participate in a voice quality test with the identified quality server.

9. The method of claim 7, wherein the second message includes a telephone number of a first quality server local to the first apparatus, and a telephone number of a second quality server local to the second apparatus, to enable the first apparatus to initiate a voice call to the telephone number of each of the first quality server and second quality server, and participate in a voice quality test of the voice call with each of the first quality server and second quality server.

10. A non-transitory computer-readable storage medium having computer-readable program code portions stored therein, the computer-readable storage medium and computer-readable program code portions being configured to, with at least one processor, cause an apparatus to at least:
    receive a first message following conclusion of a voice call between a first apparatus and a second apparatus over a network; and in response thereto,
  obtain a geographic location of at least the first apparatus;
  prepare a second message for transmission to the first apparatus, the second message including a telephone number of a quality server to enable the first apparatus to initiate a voice call to the telephone number to participate in a voice quality test with the quality server, the voice quality test including calculation of a score reflecting a quality of the voice call;
  receive the score; and
  correlate the score with the geographic location of at least the first apparatus to facilitate tuning the network based on the score and the geographic location.

\* \* \* \* \*